(12) United States Patent
Ba-Tis et al.

(10) Patent No.: US 10,122,924 B2
(45) Date of Patent: *Nov. 6, 2018

(54) CAMERA MODULES USING MEMS MICRO ELECTROSTATIC PISTONTUBE ACTUATORS FOR AUTOFOCUS (AF) AND OPTICAL IMAGE STABILIZATION (OIS)

(71) Applicants: Faez Ba-Tis, Toronto (CA); Ridha Ben-Mrad, Toronto (CA)

(72) Inventors: Faez Ba-Tis, Toronto (CA); Ridha Ben-Mrad, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,210

(22) Filed: Jan. 23, 2017

(65) Prior Publication Data

US 2018/0213154 A1 Jul. 26, 2018

(51) Int. Cl.
*H04N 5/232* (2006.01)
*H04N 5/225* (2006.01)
*B81B 3/00* (2006.01)

(52) U.S. Cl.
CPC ....... *H04N 5/23287* (2013.01); *B81B 3/0029* (2013.01); *H04N 5/2253* (2013.01); *H04N 5/2254* (2013.01); *H04N 5/23212* (2013.01); *B81B 2201/034* (2013.01); *B81B 2201/047* (2013.01); *B81B 2203/0136* (2013.01)

(58) Field of Classification Search
CPC ............ H04N 5/23287; H04N 5/2253; H04N 5/2254; H04N 5/2257; H04N 5/23212; B81B 3/0029; B81B 2201/047; B81B 2203/0136; B81B 2201/034
See application file for complete search history.

(56) References Cited

U.S. PATENT DOCUMENTS

| | | | | |
|---|---|---|---|---|
| 9,091,802 B2 * | 7/2015 | Lee | ................ | G03B 3/02 |
| 9,306,475 B1 * | 4/2016 | Ba-Tis | ................ | H02N 1/006 |
| 9,813,602 B2 * | 11/2017 | Ba-Tis | ................ | H04N 5/232 |
| 2003/0142218 A1 * | 7/2003 | Yamazaki | .......... | H04N 5/23248 348/208.6 |
| 2013/0329106 A1 * | 12/2013 | Bigioi | ................ | G03B 3/10 348/308 |
| 2015/0350499 A1 * | 12/2015 | Topliss | ................ | H04N 5/2253 348/373 |
| 2015/0350500 A1 * | 12/2015 | Gutierrez | ............ | H04N 5/2253 348/374 |
| 2016/0330375 A1 * | 11/2016 | Sekimoto | ................ | G03B 5/00 |

* cited by examiner

*Primary Examiner* — Luong T Nguyen
(74) *Attorney, Agent, or Firm* — Nasser Ashgriz; UIPatent Inc.

(57) ABSTRACT

Miniature camera modules that achieve autofocus (AF) and optical image stabilization (OIS) using piston-tube electrostatic actuators are disclosed. Various embodiments of the camera modules that work on two main mechanisms are disclosed. The two mechanisms are the whole barrel motion leading to AF and OIS and the single lens motion leading to AF. The MEMS actuator is integrated within a housing which is, in turn, coupled with an image sensor module. Autofocus is achieved by a translational motion of the piston-tube electrostatic actuator to translate the whole barrel back and forth. OIS is achieved by tilting the whole barrel using the tilting action of the piston-tube actuator.

19 Claims, 14 Drawing Sheets

SECTION A-A

During translation
along the Z-axis

During rotation about
the x-axis

SECTION A-A

SECTION A-A

CAMERA MODULES USING MEMS MICRO ELECTROSTATIC PISTONTUBE ACTUATORS FOR AUTOFOCUS (AF) AND OPTICAL IMAGE STABILIZATION (OIS)

FIELD OF THE INVENTION

The invention relates to the field of miniature cameras that utilizes MEMS electrostatic actuators to move optical elements to achieve autofocus and/or optical image stabilization. The present invention of camera modules could be used in a variety of electronic devices such as smartphones, iPads, laptops, and other electronic devices that require miniature camera modules for imaging.

BACKGROUND OF THE INVENTION

Different types of actuators have been used to achieve autofocus in miniature cameras. Those actuators achieve autofocus based on two main mechanisms: single lens motion or whole barrel motion. In the former, a lens of about 5 mg from within the lens stack is translated up to 100 microns, whereas in the latter, the entire lens barrel of almost 45 mg is translated up to 200 microns.

Voice Coil Motors (VCMs) are widely used to achieve autofocus in digital still cameras; however, when a VCM is used in miniature cameras it raises a number of issues. The drawbacks in using VCMs include high power consumption, slow autofocus speed, large size of the motor, and an undesired lens tilt of 0.2° which results in a deterioration of the image quality.

A recent technology to achieve autofocus in miniature cameras is MEMS electrostatic actuation. This actuation method offers low power consumption, high response speed, and small size actuators. Currently, two types of electrostatic actuators are being pursued to achieve autofocus in miniature cameras. U.S. Pat. Ser. Nos. 8,358,925 B2/8,004,780 B2/8,786,967 B2 disclose autofocus systems for miniature cameras that work based on the concept of electrostatic comb-drive actuators. These autofocus actuators have a number of drawbacks. First, the structure of these actuators is complex as it includes many mechanical parts such as: rotary comb drive actuators, inner hinge flexures, ball-in-socket snubbers, movable frame, outer hinge flexures, motion control torsional flexures, cantilever flexures, fixed frame, pivot axis, serpentine contact flexure, pseudo-kinematic mount, and a platform. Second, the electrode lay-out that those actuators utilize does not lead to generating a large force, thus they are not suitable for translating large mass loads of the order of tens of milligrams, meaning that they cannot be used to achieve autofocus based on the whole barrel motion mechanism. Third, the structure of the actuators is not stiff enough as dimensions of the flexure mechanical components are thin, thus integrating the lens within the central ring of the actuator is a delicate and difficult process. Fourth, the nature of the structure of the actuators requires two mechanical snubbers to be attached on both sides of the rotors to stop undesired motion of the rotors during sudden shocks. This can be clearly understood by realizing that the rotors that hold the lens can freely move in two directions, up and down, and the stators cannot be used as stoppers against the rotors motion. These drawbacks make the assembly process of the camera module parts (MEMS actuators, lens barrel, housing, snubbers, etc.) complex and expensive.

U.S. Pat. No. 8,711,495 discloses a MEMS autofocus mechanism that utilizes three translational vertical comb-drive actuators to achieve autofocus in miniature cameras. This invention addresses two main concerns associated with MEMS actuators that prevented them from being used commercially: failure to survive a drop test and complexity in the integration of the optical elements into the actuator. Although the invention presents a stiff flexure actuator platform and a method for easy integration of the lens within the actuator, it requires a high driving voltage to generate a sufficiently large force to move a mg size payload because of the limited area of the electrodes of the actuator. The actuator has also a limited out-of-plane translational stroke, as the maximum height (thickness) of the electrodes is 20 microns, which is not enough to achieve autofocus. There is no MEMS technology that is being used to achieve OIS in miniature camera modules.

There is a need for MEMS actuator solutions to achieve autofocus and OIS in miniature camera modules. These MEMS actuators and associated components that form the camera module need to be sturdy, inexpensive, and easy to assemble. That necessarily requires MEMS electrostatic actuators that are reliable and sufficiently stiff to resist sudden shocks, are easy to integrate within the camera modules, and are inexpensive to manufacture.

SUMMARY OF THE INVENTION

The present invention discloses MEMS autofocus camera modules that achieve autofocus and/or OIS using MEMS electrostatic piston-tube actuators, disclosed in U.S. Pat. No. 9,306,475 and WIPO application PCT/IB2014/001498, which is incorporated in whole in the present camera. This MEMS electrostatic actuator utilizes a piston-tube type configuration which consists of two structures: a fixed one and a moving one. The fixed structure contains a plurality of electrodes which act as pistons in a piston-tube type system. The pistons may be arranged in square, circular, or any other configuration. These pistons are attached to a base (i.e. the base surfaces on which the piston are positioned define the xy plane) and protrude in a perpendicular direction to it (i.e. along the z-axis), and they form the stator of the actuator. The moving structure contains a plurality of tubes (through holes) that have cross-sections similar to the cross-sections of the pistons. The moving tubes surround an actuator plate, and they are suspended by three or more supporting springs used to return the actuator plate to its initial position in the absence of an applied voltage. The pistons can be divided into a number of groups that are electrically separated from each other to provide bi-axial tilting about the in-plane axes (x and y). When a voltage is applied across the rotor and all of the stators, an electrostatic force develops between the adjacent pistons and tubes in the vertical direction. This electrostatic force moves the rotor (the free moving structure) from its static position towards the stators (the fixed structure) in a pure translation (piston-style) motion along the z-axis. When the voltage drops, the rotor moves back to its equilibrium position due to the restoring force in the supporting springs. To rotate the rotor of the actuator about the x and/or y axes, a voltage is applied across the rotor and only one or more stators.

In the present device, a barrel/lens holder is added to the MEMS electrostatic piston-tube actuator, disclosed in U.S. Pat. No. 9,306,475 and WIPO application PCT/IB2014/001498. This barrel/lens holder absorbs the pressure or force generated during the fitting of the lens or the barrel into the central opening of the actuator plate. It also protects the springs of the rotor from breaking or buckling as it enables the rotor to remain still during the attachment process. This holder is needed when the thickness (height) of the rotor is small, for example, less than 50 microns. In case of a thicker rotor actuator (e.g. thickness around 100 microns), this holder can be eliminated as the rotor is sufficiently stiff to absorb the mechanical pressure generated during the attachment process.

In the camera modules described in this invention, autofocus (AF) and OIS are achieved based on two main approaches: the whole barrel motion approach (AF and OIS) and the single lens motion approach (AF). Various embodiments of camera modules based on both approaches are described in detail.

According to one embodiment of the present invention, a lens barrel that weighs tens of milligrams and contains one or more optical elements is attached to the extended barrel holder of the MEMS piston-tube actuator. The rotor of the MEMS piston-tube actuator translates the whole lens barrel for up to 100 microns (the required stroke to achieve the desired AF is usually different for various designs of the lens barrel) to achieve autofocus for objects located from 10 cm to infinity. The rotor of the MEMS piston-tube actuator may also rotate the whole barrel to achieve optical image stabilization (OIS), which, in turn, requires a variable prism to be sandwiched between the barrel and the image sensor to compensate for the rotation.

In another embodiment of the present invention, a front lens of a lens stack is integrated within the central opening of the actuator plate, and a stationary lens barrel contains the rest of the lenses of the lens stack and is located behind the MEMS actuator. Both components (the MEMS actuator containing the front lens and the stationary barrel) are fitted into the camera housing. The actuator translates the lens up to 100 microns to achieve autofocus for objects located at a distance varying from 10 cm to infinity.

The main advantages of using these actuators as described in the present invention of the camera modules are: high stiffness of the flexures that leads to high autofocus speed; ease of assembly of the lens within the actuator and ease of assembly of the actuator within the camera modules which enables the modules to be mass produced; the configuration of the actuator (rotor on top of the stator) leads to elimination of the requirement for mechanical snubbers; and simplicity of the actuator structure which makes the modules inexpensive to manufacture. The piston-tube configuration of the present MEMS system enables the use of a wide area for the electrodes. Therefore, a high output force in the translation mode (or a high torque in the tilting mode) can be generated.

BRIEF DESCRIPTION OF DRAWINGS

Embodiments herein will hereinafter be described in conjunction with the appended drawings provided to illustrate and not to limit the scope of the claims, wherein like designations denote like elements, and in which:

DETAILED DESCRIPTION OF THE INVENTION

The various embodiments of the present invention listed in this document are based on two main mechanisms for achieving autofocus (AF) and optical image stabilization (OIS) in miniature cameras. These two mechanisms are the single lens motion (i.e. to achieve AF) and the whole barrel motion (i.e. to achieve AF and OIS) mechanisms. Various embodiments of the present invention using these two mechanisms are described in detail herein.

Whole Barrel Motion AF and OIS Embodiments

Based on this mechanism, the actuator translates the whole lens barrel which weighs tens of milligrams, with a stroke of up to 100 μm in order to achieve AF. The whole barrel is also rotated around two axes perpendicular to its longitudinal axis in order to achieve OIS. Various embodiments of the present invention achieving AF and OIS based on this mechanism are described in detail.

In one embodiment of the present invention, the camera module comprises a MEMS electrostatic piston-tube actuator, a lens barrel, a housing, and an image sensor module.

Figure 1A:
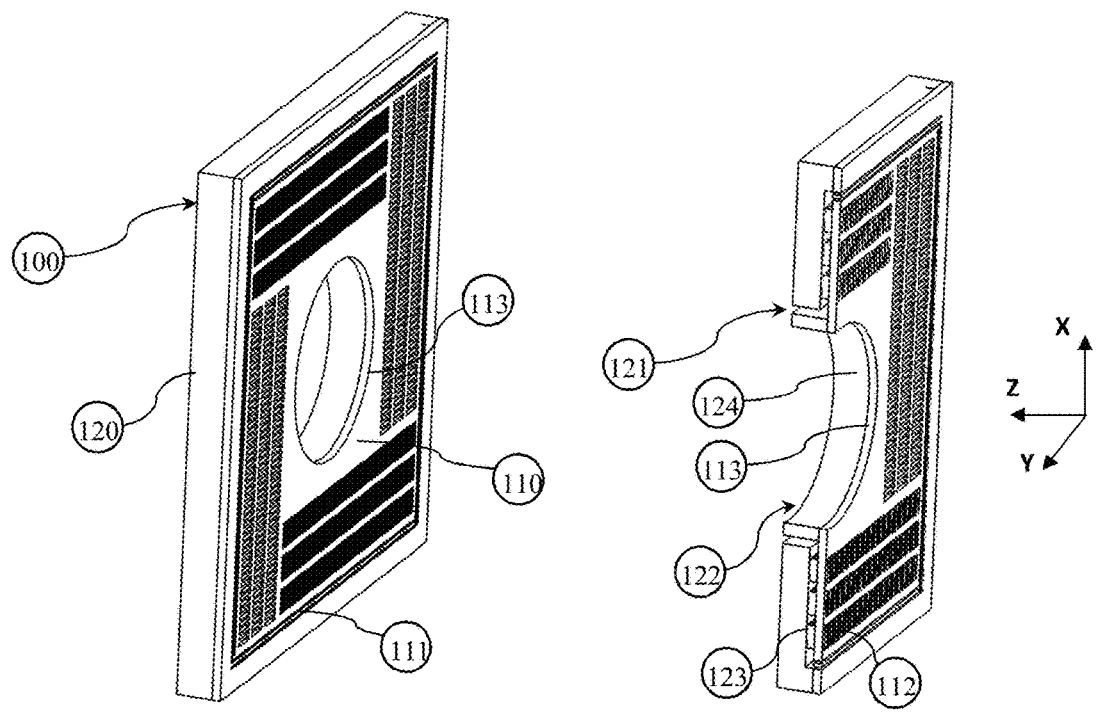
FIG. 1A shows a perspective and cross-sectional perspective views of a MEMS electrostatic piston-tube actuator used to achieve autofocus using the whole barrel motion, according to one embodiment of the present invention.
Figure 1B:
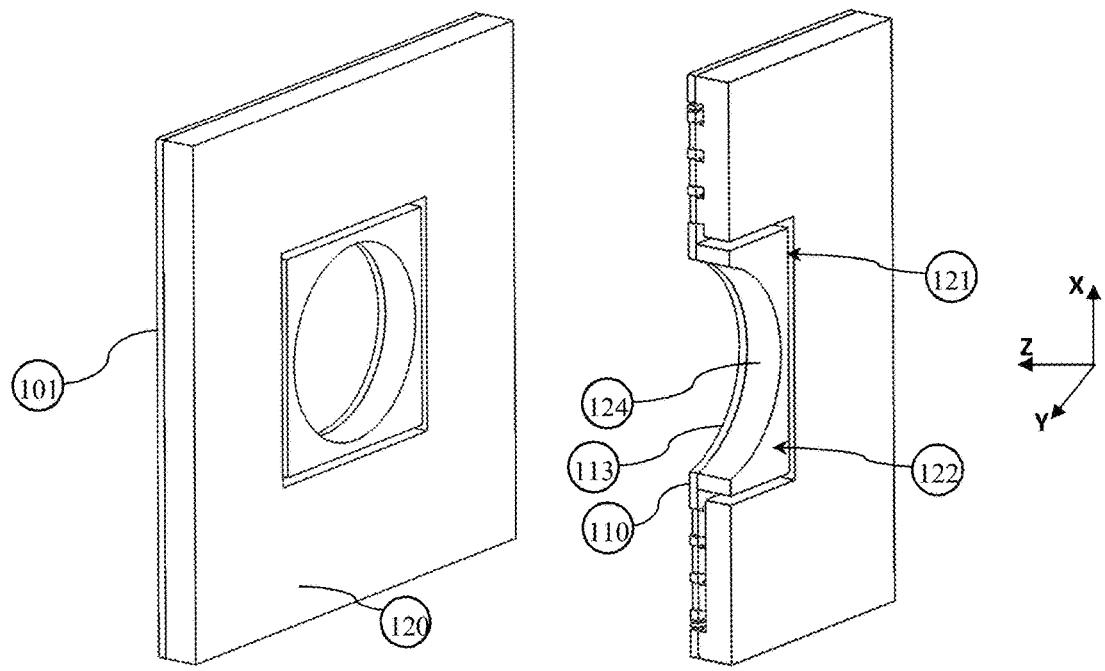
FIG. 1B illustrates back side views of FIG. 1A.

The MEMS piston-tube actuator 100 described in detail in U.S. Pat. No. 9,306,475 is used and has been designed to facilitate the attachment of the lens barrel into it. This MEMS piston-tube actuator uses a number of subarrays of pistons 123 that are formed on the stator and an array of tubes 112 that is formed on the rotor layer 101. An extended barrel holder 122, refer to FIG. 1A-B, was added to the central opening of the actuator so that it absorbs the pressing force during the attachment of the lens barrel to the actuator using a press-fit technique. In another embodiment, the lens barrel may be attached to the actuator using a thread-fit technique. The extended lens barrel holder 122 consists of two parts: upper 113 and lower 124 parts. The upper part is formed by the thickness of the rotor 110, and the lower part is formed by the thickness of the stator 120. The extended lens barrel holder is fabricated by a back side etching step during the fabrication process of the actuator to separate the lower part 124 from the stator 120 by the gap g 121. The rotor is attached to the non-moving rotor-support-frame using springs 111.

The lens holder is needed when the thickness (height) of the rotor, and thus the thickness of the springs connecting the rotor to the non-moving rotor-support-frame, are both small, for example, less than 50 μm. In case of thicker rotor actuators (e.g. thickness in excess of 50 μm), this part could be eliminated as the rotor is sufficiently stiff to absorb any mechanical pressure during the insertion of the barrel within the actuator central opening.

Mechanical snubbers are not needed for the autofocus piston-tube actuator as the housing of the camera module is used as a mechanical snubber on one side and the stator of the actuator works as snubber for the other side. The high stiffness of the springs of the piston-tube electrostatic actuator also makes them highly reliable regardless of whether or not the housing is used as a mechanical snubber. Experimental data shows that the rotor of the actuator could be translated up to 2000 microns when a mechanical pressure is applied before the springs buckle or break. This is a highly advantageous feature that enables such MEMS electrostatic actuators to resist sudden mechanical shock and drops.

Other MEMS electrostatic piston-tube actuators may be used in various embodiments of the present invention of the miniature camera modules as described in U.S. Pat. No. 9,306,475 and WIPO application No. PCT/IB2014/001498, which are incorporated by reference herein below.

Figure 1C:
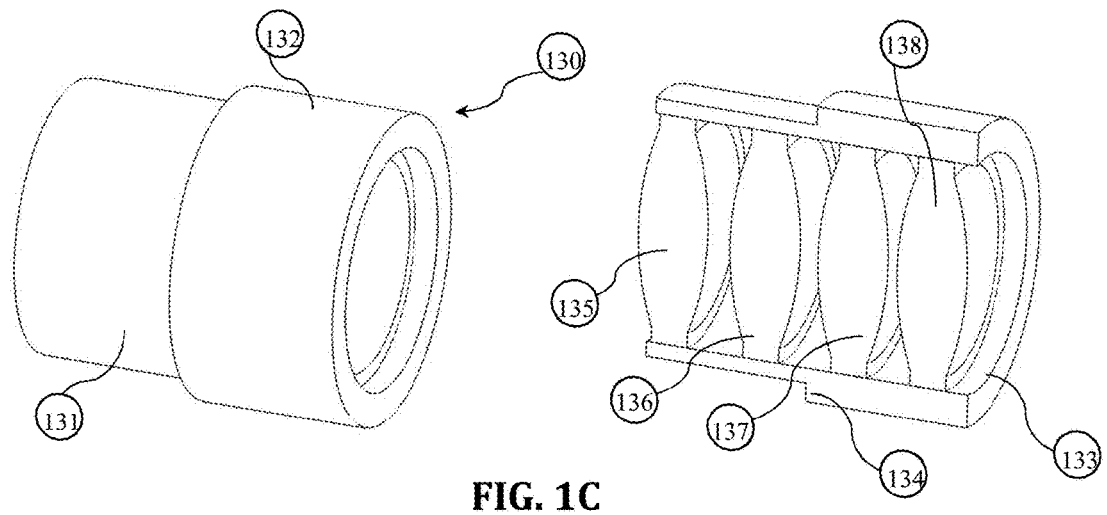
FIG. 1C shows a perspective and cross-sectional perspective views of a lens barrel, according to one embodiment of the present invention.
Figure 1D:
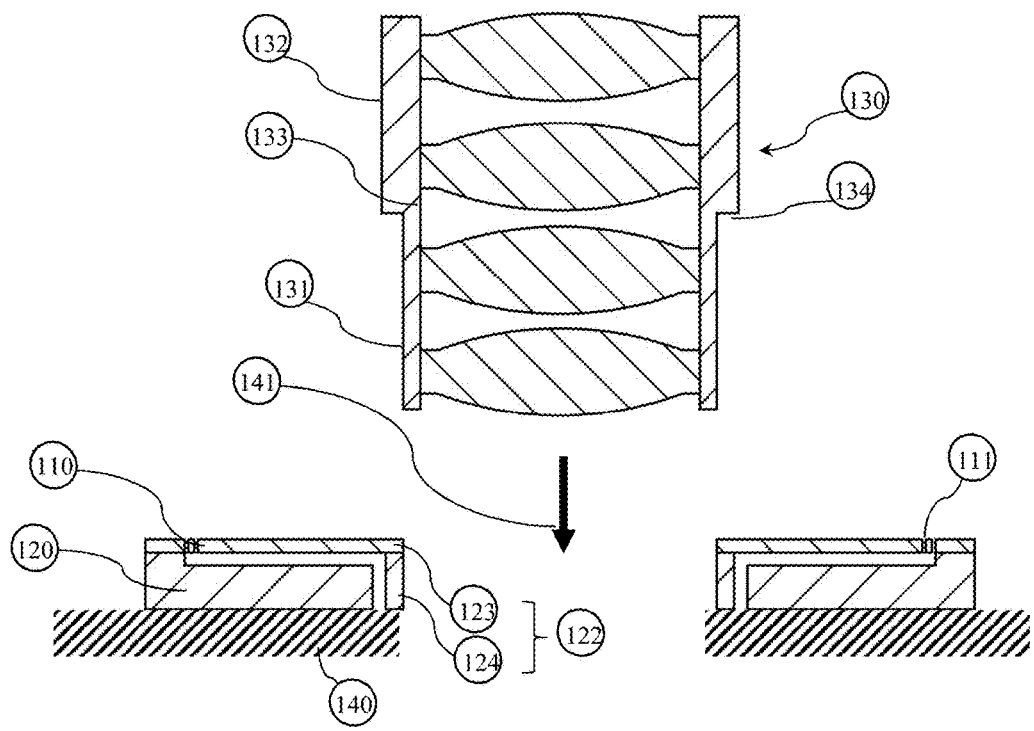
FIG. 1D illustrates the attachment process of the lens barrel into the MEMS electrostatic piston-tube actuator using a press-fit technique, according to one embodiment of the present invention.

The lens barrel 130, shown in FIG.1C, has an elongated annular ring-shape and contains the lens stack. It has two different outer diameters 131 132 and one inner diameter 133 forming a through hole. The inner diameter of the lens barrel 133 may lead to a straight-barrel design or a stepped barrel design, and the lenses 135 136 137 138 are mounted according to the underlying design and they are co-centric with respect to the barrel. The drawings of the lenses 135 136 137 138 are merely illustrations to indicate the existence of a number of lenses inside the lens barrel; they do not represent the actual design and number of lenses being used within the barrel. The lenses could have any optical design; the lens barrel may contain a single lens or two or three or four or five or more lenses. An IR filter may be included inside the barrel, or it could be located outside the barrel between the barrel and the image sensor. The small outer diameter 131 of the barrel is almost equal to the diameter of the lens holder 122 of the actuator to ensure the lenses are centered with respect to the center of the actuator; an overlap of sub-micron size between the inner diameter of the extended barrel holder 122 and the small outer diameter 131 of the lens barrel 130 is required to ensure a good quality fit. The large outer diameter 132 of the barrel facilitates the attachment of the barrel with the increase in diameter 134 of the barrel 130, formed by the difference in the diameters 131 132, works as a stopper during the press-fit process. FIG. 1D illustrates the attachment process of the lens barrel to the MEMS actuator. The bottom side of the extended barrel holder 122 is touching the ground 140 during the attachment and is attached to the rotor 110 of the actuator; this enables a small thickness springs 111 attaching the rotor to the non-moving rotor-support-frame to remain undeformed during the attachment so that the springs do not buckle or break. An adhesive could be added at 134 on the outside of the barrel to enhance the bonding of the lens barrel into the lens holder of the actuator.

It will be readily apparent to the one with ordinary skills in the art that lens barrels could be designed in various configurations, and different techniques could be used to attach that barrel without departure from the scope of the invention.

Figure 1E:
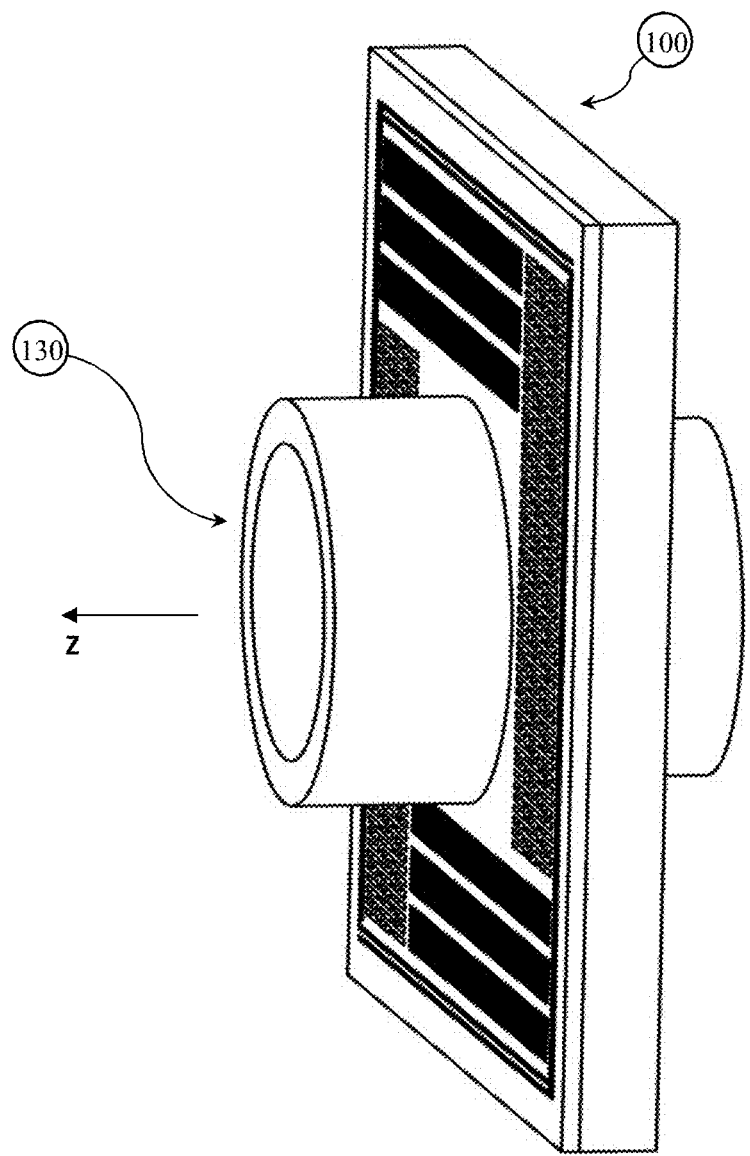
FIG. 1E is a cross-sectional view illustrating the MEMS actuator and the lens barrel after attachment, according to one embodiment of the present invention.
Figure 1F:
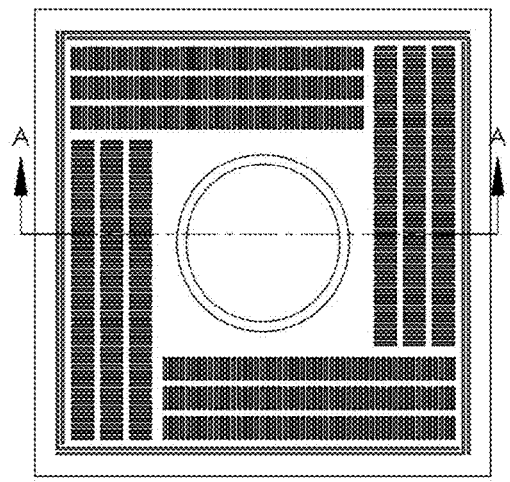
FIG. 1F shows front and cross-sectional views of FIG. 1E.
Figure 1G:
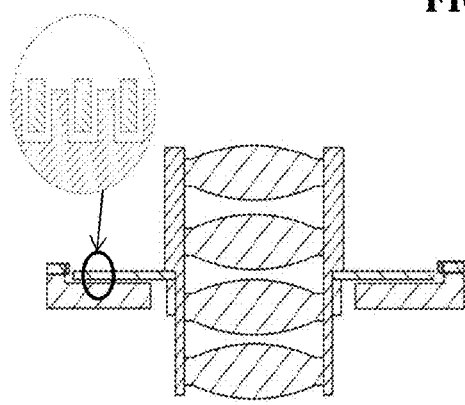
FIG. 1G shows cross-sectional views of FIG. 1E illustrating the actuator motion during the translation and rotation.
Figure 1G:
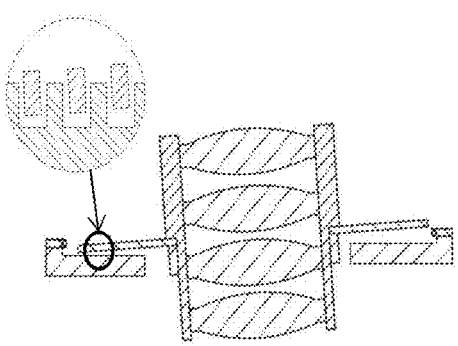
Figure 2A:
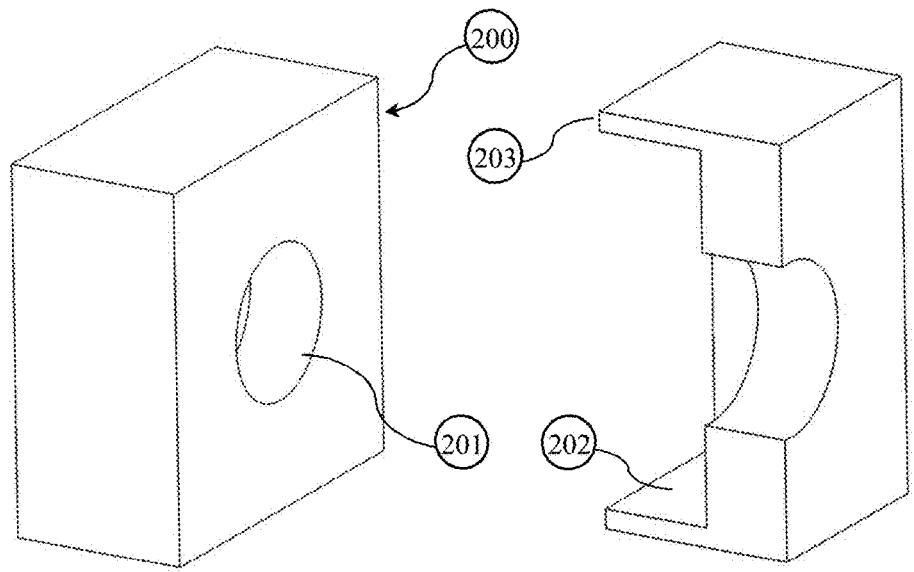
FIG. 2A is a perspective and cross-sectional perspective views of the camera housing, according to one embodiment of the present invention.

FIG.1E-F show the actuator 100 and the lens barrel 130 after attachment. They are, then, attached to a housing 200, shown in FIG.2A. The housing has two different holes: a square-shaped hole 202 and a circular hole 201. The square-shaped hole 202 is sized to fit and receive the MEMS electrostatic actuator 100 so that it is co-centric with the center of the actuator. The circular through hole 201 has a diameter larger than the diameter of the large outer diameter 132 of the lens barrel 130 so that it allows the motion of the lens barrel during autofocusing and blocks light from penetrating to the image sensor other than light going through the lenses. In addition, it protects the MEMS actuator from dust particles. The MEMS piston-tube actuator 100 with the barrel 130 attached is inserted in the square-shaped hole 202 so that the top side of the rotor 110 of the MEMS actuator faces the bottom side of the squared-shape hole 202. This way of assembly, with the rotor facing the bottom side of the square-shaped hole, has an advantage of protecting the MEMS actuator form severe mechanical shocks. That is because the bottom side of the square-shaped hole 202 works as a mechanical snubber for the rotor in one direction, and the stator 120 works as a mechanical snubber from the other direction to inhibit sudden motion of the actuator during severe shocks and vibration. Therefore, no additional mechanical snubbers are needed in the present invention which could otherwise complicate the integration process of the camera module. Openings in the housing may be created to facilitate the electrical routing for the actuator. In another method of assembly, the actuator might be flipped over so that the bottom surface of the stator 120 faces the bottom side of the square-shaped hole 202. This method could be used when a thicker-rotor actuator is in use (i.e. a rotor thickness in the range of 100 microns) so that there is no need for mechanical snubbers as the large stiffness of the springs protects the actuator against sudden shocks. This method of assembly is preferable for autofocus function as it leads to focusing on objects at infinity position when the actuator is at the rest position, and full stroke actuation is required to focus on objects that are in the range of 10 cm. Such mode of operation, actuator at rest for focus at infinity, saves energy. FIG.1G shows the actuator motion during the translation along the z-axis or the rotation about x and y axes.

In other embodiments, the other two degrees of freedom motion of the piston-tube actuator, i.e. bi-axial rotations about the in-plane axes: x and y, are utilized to rotate the lens barrel to achieve optical image stabilization while the translation of the actuator is used to achieve autofocus, simultaneously. In this case, a variable prism is sandwiched between the lens barrel and the image sensor to compensate for optical aberrations.

Figure 2B:
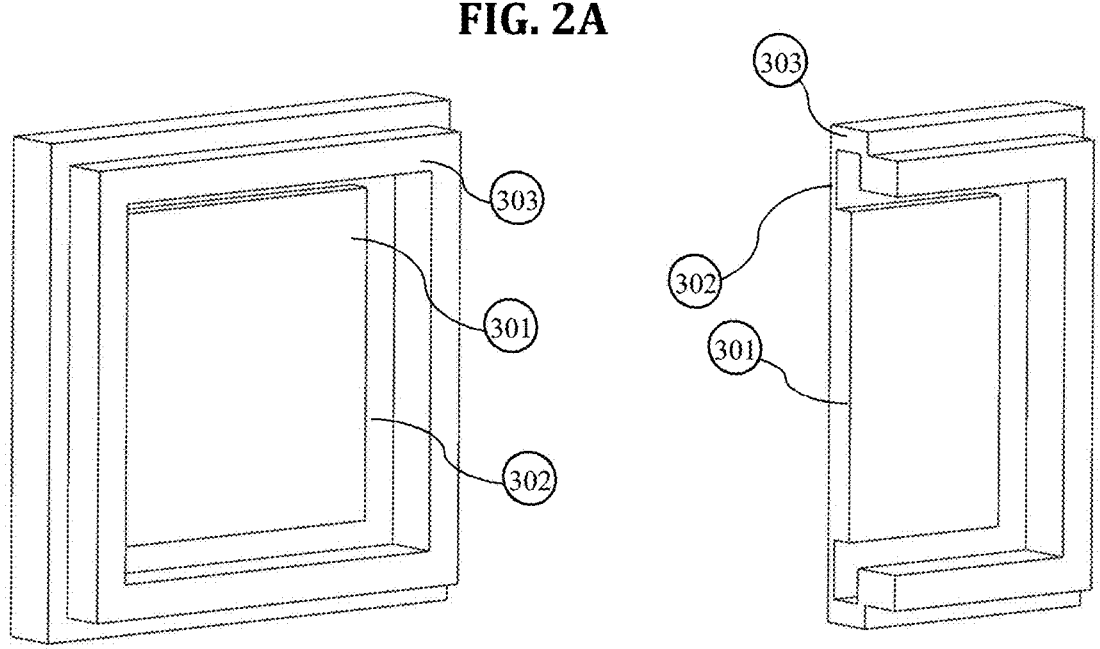
FIG. 2B is a perspective and cross-sectional perspective views of the image sensor module, according to one embodiment of the present invention.
Figure 3A:
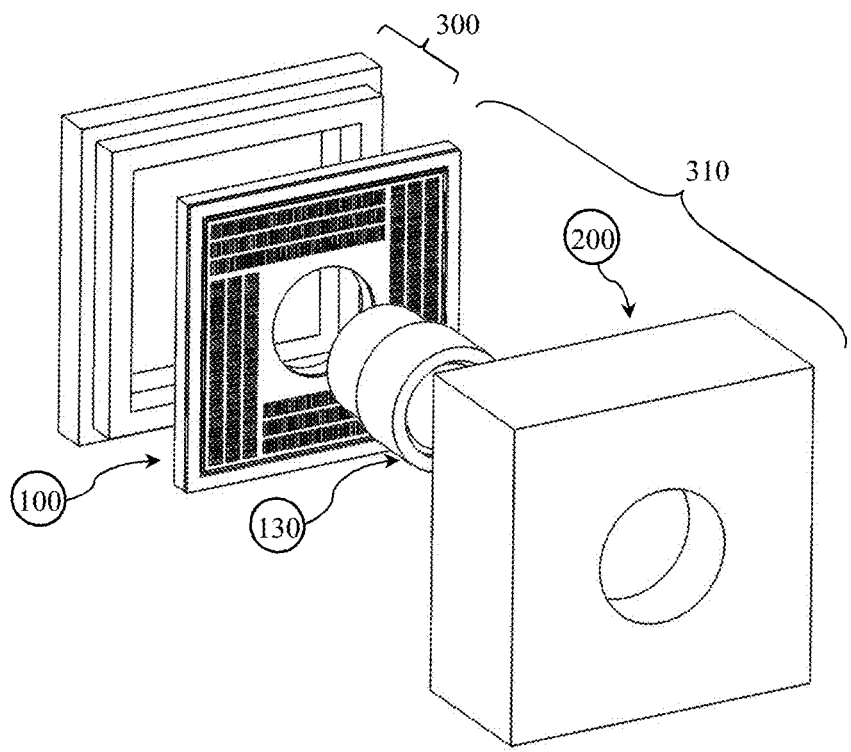
FIG. 3A is an exploded view of the final assembly of the camera module including the piston-tube electrostatic actuator, lens barrel, housing, and image sensor module, according to one of embodiment of the present invention.

The attached three components (i.e. MEMS actuator 100, the lens barrel 130, and the housing 200) form the front part 310 of the miniature camera, shown better in FIG. 3A, and the image sensor module 300, shown in FIG. 2B, forms the back part of the camera as shown in FIG. 3A.

The image sensor module 300 consists of an imager 301, a printed circuit board (PCB) 302, electrical connector and/or a base 303. The image sensor could be any type of image sensor, and it may be connected to the PCB using wire bonding or flip chip bonding or by any other suitable means. The image sensor could be packaged in any type of image sensor package. Electrical connector or flex lead are used to connect the camera module to the image processing unit. The image sensor module could have a base 303 to facilitate the attachment of the front part of the camera to the back part, or the housing 200 in the front part of the camera module may be designed so that it fits directly with the PCB and the lens barrel is concentric with respect to the center of the image sensor.

The front part of the MEMS autofocus camera 310 (i.e. MEMS actuator 100, the lens barrel 130, and the housing 200) is, then, attached to the back part of the camera 300 (i.e. image sensor module) using a press-fit technique as the neck of the base in the image sensor module is concentric with respect to the housing of the MEMS autofocus 200. In another embodiment, the front part of the camera module 310 is attached to the base in the image sensor module using a thread-fit technique which leads to more flexibility in terms of adjusting the position of the lens barrel with respect to the image sensor. Other type of mechanical fitting techniques could also be used.

Figure 3B:
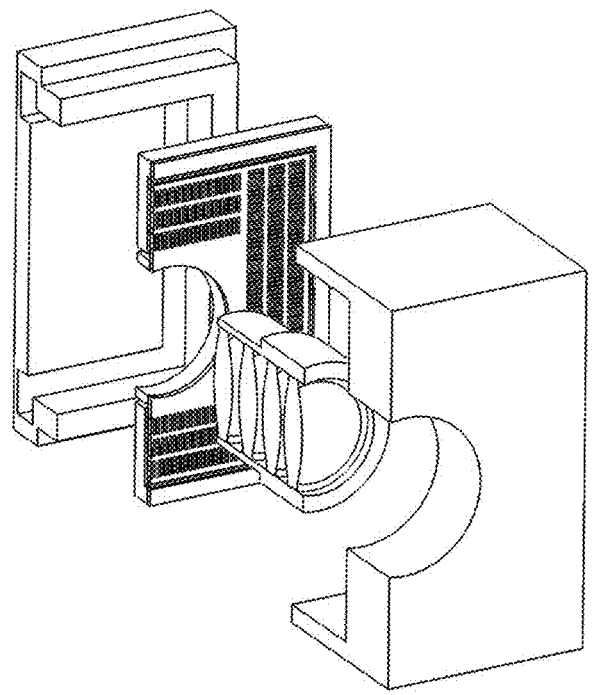
FIG. 3B is a cross-section of the exploded view of FIG. 3A.
Figure 3C:
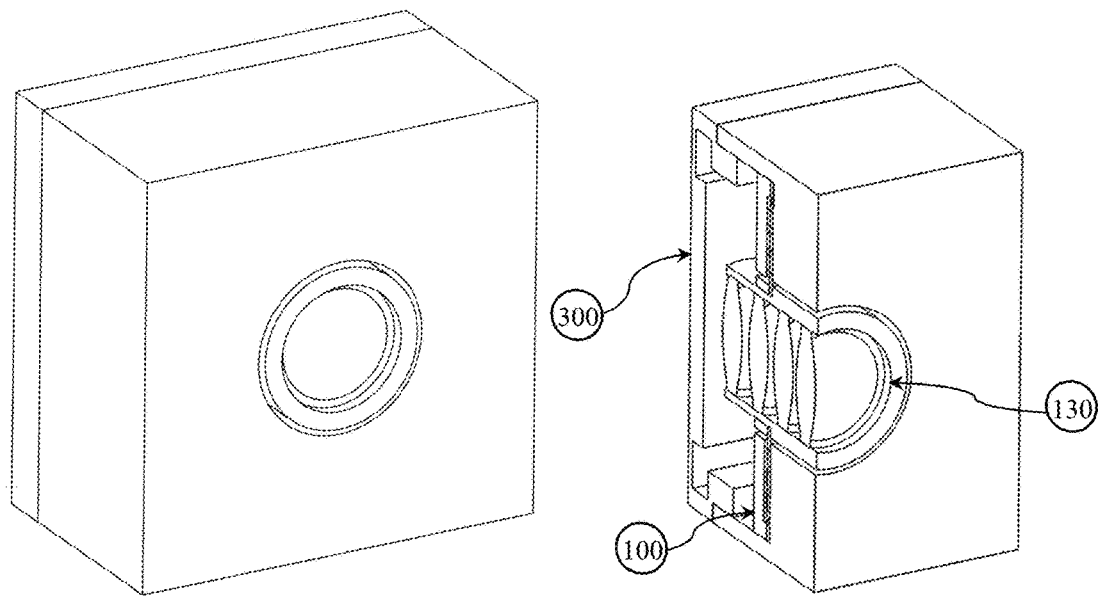
FIG. 3C is a perspective and cross-sectional perspective views of the assembled MEMS autofocus camera module, according to one embodiment of the present invention.
Figure 4:
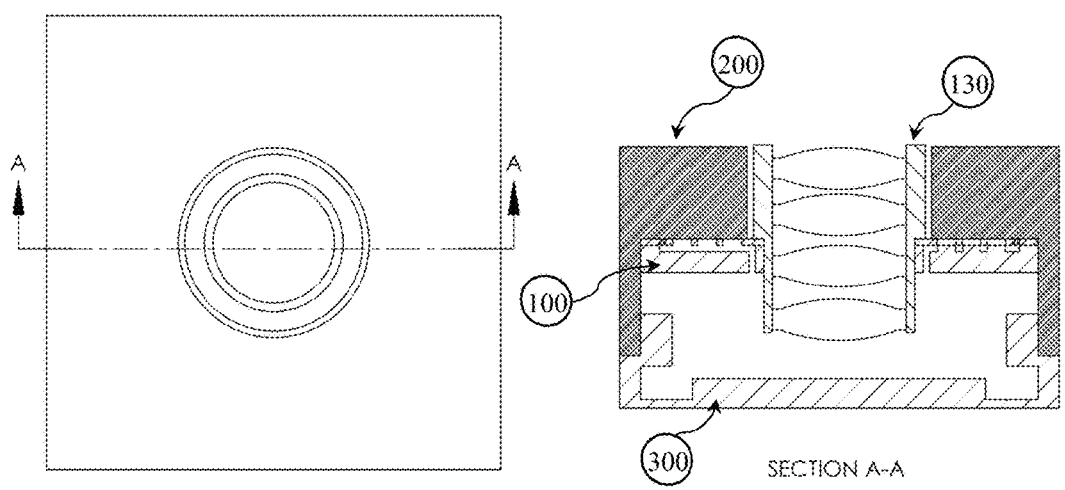
FIG. 4 is a front and cross-sectional views of the assembled MEMS autofocus camera module, according to one embodiment of the present invention.

FIG. 3A and FIG. 3B are exploded views illustrating the main components of the camera module. FIG. 3C and FIG. 4 show different views of the final assembly of the whole barrel autofocus/OIS camera module that achieves autofocus and/or optical image stabilization using the piston-tube electrostatic actuator. When the OIS function is to be used, a variable prism is needed to compensate for the rotation of the lens barrel and it can be sandwiched between the image sensor and the barrel. Different designs of the piston-tube actuator that are able to translate and rotate a mass load are described in details in U.S. Pat. No. 9,306,475 and WIPO application No. PCT/IB2014/001498.

Single Lens Motion Autofocus Embodiments

In this design of the camera module using the MEMS actuator, the single lens motion technique is used to achieve autofocus. It requires a translation of a 5 mg or similar size lens for a stroke of up to 100 um. This technique has numerous advantages over the autofocus methods based on the whole barrel motion. It leads to a reduction of the size of the miniature cameras because the diameter of the front lens is smaller than the diameter of the whole barrel, thus the actuator to be used has a smaller size than actuators needed to move the whole barrel. It also requires lower voltage input signals to drive the actuator and can lead to achieving a higher autofocus speed. This higher autofocus speed is attributed to the fact that the mass of the load on the single lens actuator is significantly less than that of the whole-barrel actuator (single-lens mass of about 5 mg as opposed to a barrel mass of about 45 mg), thus the single lens actuator module has a higher natural frequency.

Figure 5A:
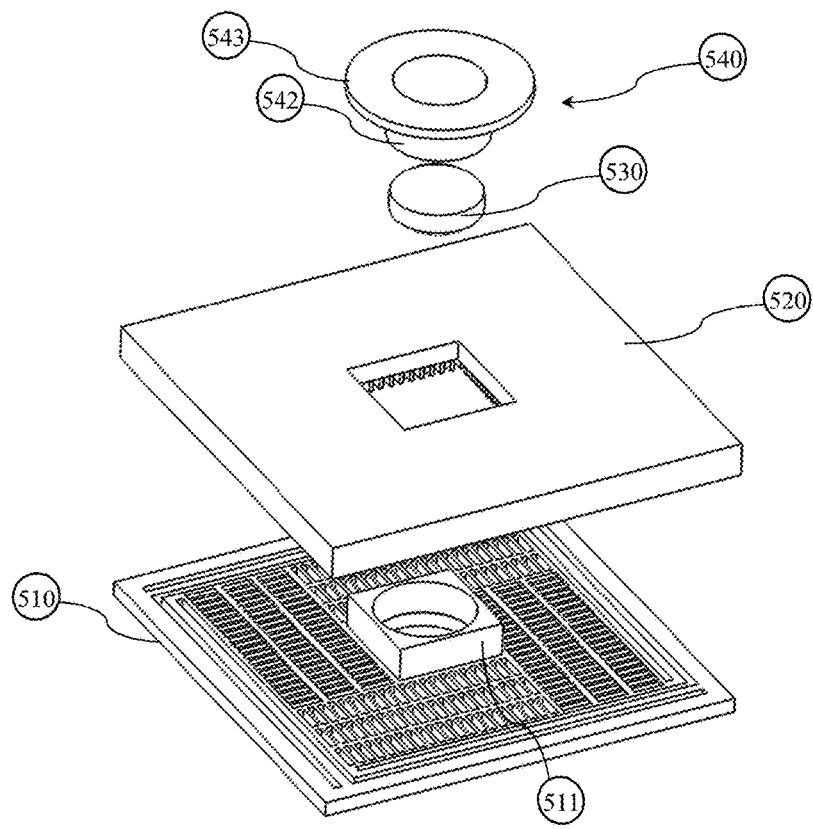
FIG. 5A is an exploded view illustrating a MEMS electrostatic piston-tube actuator holding the front lens of the lens train, according to one embodiment of the present invention.
Figure 5B:
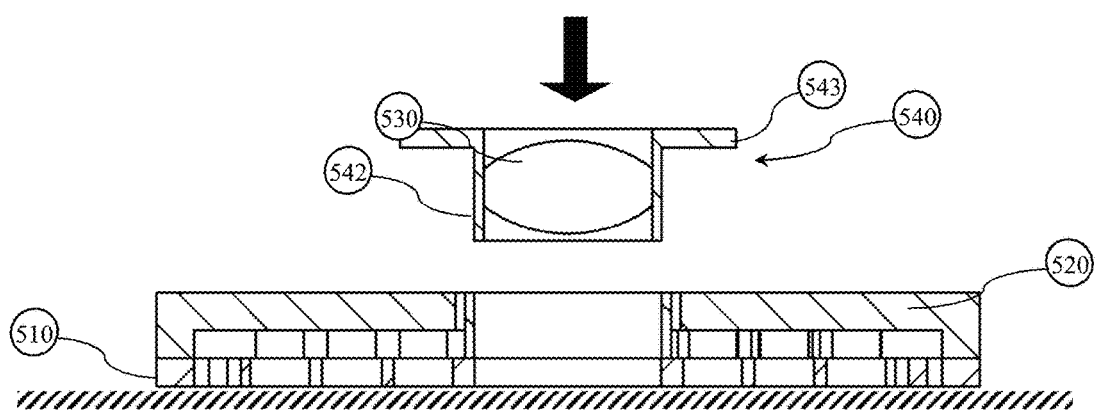
FIG. 5B illustrates the attachment process of the front lens into the MEMS piston-tube electrostatic actuator using a press-fit technique, according to one embodiment of the present invention.
Figure 5C:
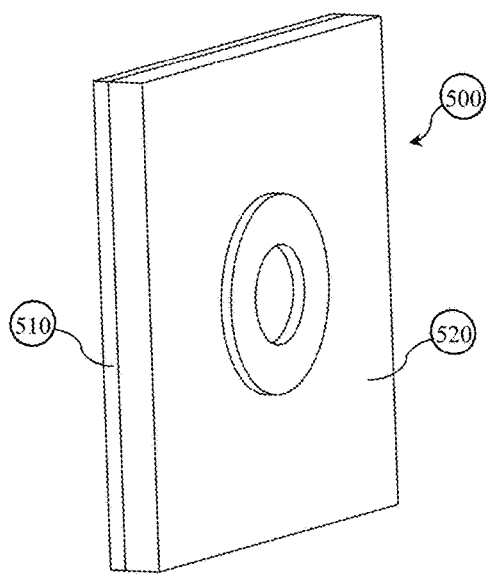
FIG. 5C is a perspective view of the attached structure of the MEMS electrostatic actuator holding the front lens, according to one embodiment of the present invention.
Figure 5D:
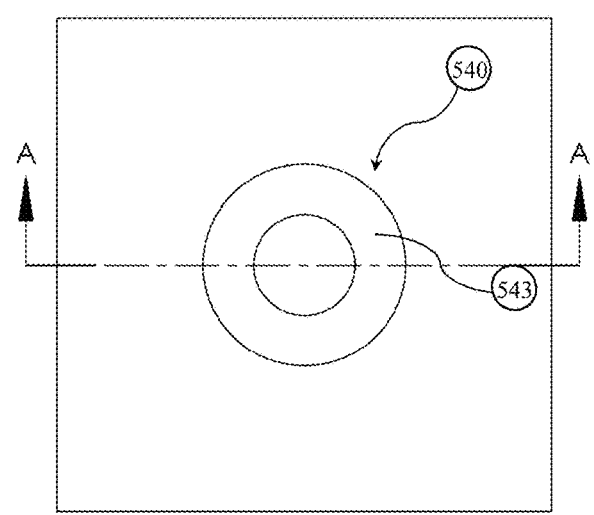
FIG. 5D is a front view of the attached structure of the MEMS electrostatic actuator holding the front lens, according to one embodiment of the present invention.
Figure 5E:
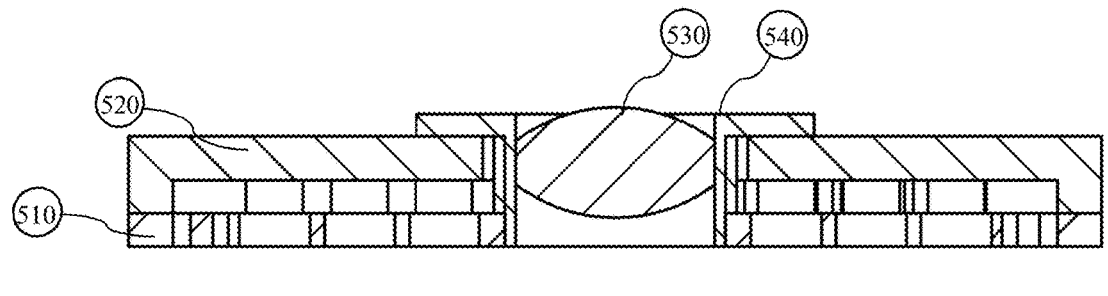
FIG. 5E is a cross-sectional view of the attached structure of the MEMS electrostatic actuator holding the front lens, according to one embodiment of the present invention.

The MEMS piston-tube actuator illustrated in FIG. 5A consists of a rotor 510 and a stator 520. The rotor may or may not contain an extended lens holder 511. A lens 530 (preferably to be the front one; although other lenses within the lens train could be used to achieve single lens autofocusing) is sub-cell mounted in a metal or plastic cell 540. The cell is an annular tube 542 that has a lip 543 at one end. The lip works as a stopper during the insertion of the cell inside the extended lens holder, see FIG. 5B. It is preferable to mount the lens in a metallic mount (i.e. sub-cell mount) over directly press-fitting the lens inside the extended lens holder because it is easier to handle a form of machined metal component than an optical polished component. The stress that might ensue from the press-fit process on the lens could be avoided when the lens is initially mounted in a metal cell. FIG. 5C-E show different views of the lens 530 and the actuator 500 after attachment.

Figure 6:
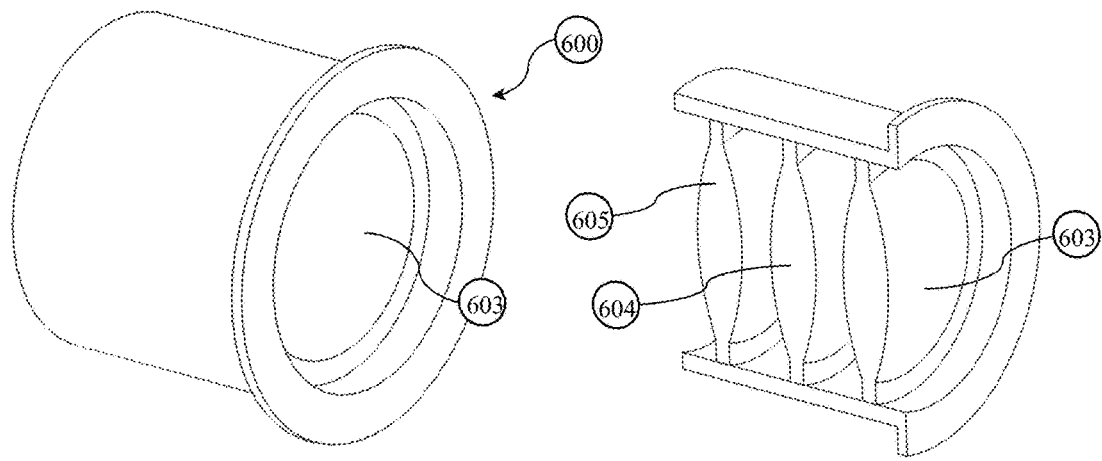
FIG. 6 shows a perspective and cross-sectional perspective views of the stationary lens barrel that contains the rest of the lenses, according to one embodiment of the present invention.

FIG. 6 illustrates a stationary lens barrel 600 that could be of any appropriate shape and that contains the rest of the lenses 603,604, 605. It has an elongated annular ring shape. It may contain one or more fixed lenses. The IR filter may be contained within the barrel or may be positioned outside the barrel between the lens barrel and the image sensor. The drawings of the lenses are just to represent the existence of the lenses, but they do not represent the actual lens design. Any optical lens design of 3, 4 or 5 or more lenses may be used; considering that one or more of the lenses are attached to one or more MEMS piston-tube actuators.

Figure 7:
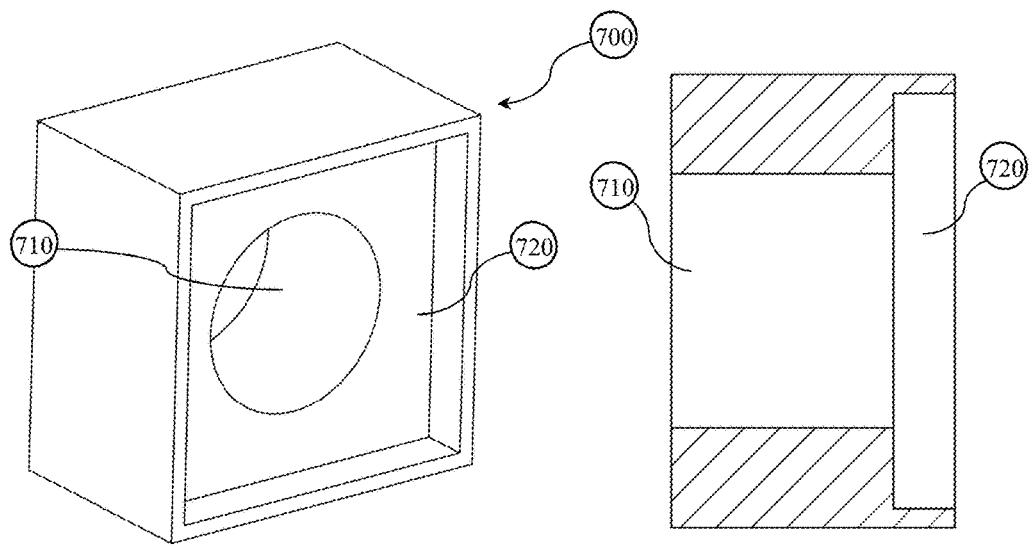
FIG. 7 is a perspective and cross-sectional perspective views of the housing of single lens autofocus camera, according to one embodiment of the present invention.

FIG. 7 illustrates the housing 700 for the MEMS actuator 500 that holds the front lens 530, and the stationary lens barrel 600. It has two holes: square-shaped 720 and circular 710; the square-shaped hole is at the front side of the housing (facing the real image) and it is sized to fit and receive the MEMS piston-tube actuator 500 that holds the front lens, and the circular hole is at the back side of the housing (facing the image sensor), and it is sized to the lens barrel 600 that contains the fixed lenses.

The MEMS piton-tube actuator 500, holding the front lens, could be attached to the front square-shaped hole 720 of the housing in two manners: the rotor side of the actuator faces the stationary lens barrel 600 or the stator side faces the lens barrel. The former has the advantage of enabling the bottom side of the front square-shaped hole 720 to work as a mechanical snubber in one direction, and in the other direction the stator works as a mechanical snubber. In the latter, i.e. the stator side of the actuator faces the lens barrel, a front cover is needed to work as a mechanical snubber to protect the actuator from severe shocks as well as from dust particles. The electrical routing of the actuator (two terminals for the actuator: one electrical connection to the stator and one to the rotor) could be established via through holes in the housing to enable wires to be connected to a circuit board.

Figure 8:
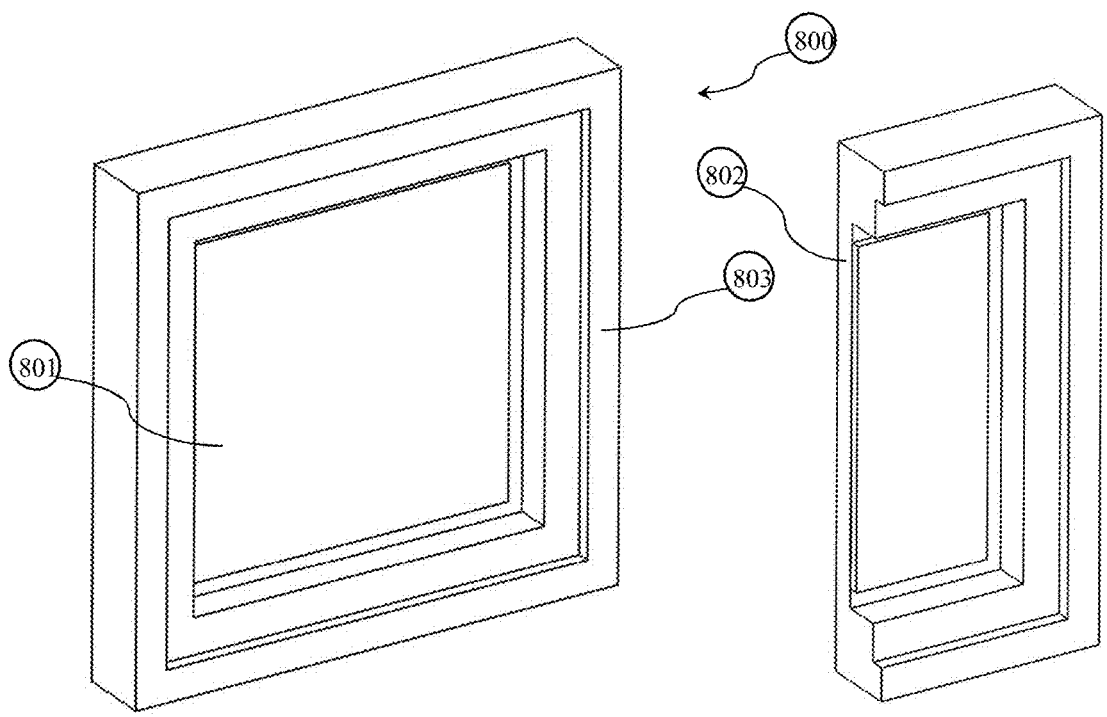
FIG. 8 is a perspective and cross-sectional perspective views of the image sensor module for single lens autofocus camera, according to one embodiment of the present invention.

FIG. 8 shows the image sensor module 800, which comprises an imager 801, a printed circuit board (PCB) 802, an electrical connector, and/or a base 803. The imager is bonded to the PCB using adhesive, bonding, ultrasonic welding or any other method that could be used for attachment. A base 803 is sized to fit the back side of the housing. The housing 700 may also be directly coupled to the PCB 802 so that the housing (necessarily the lens barrel) is concentric with the imager. The PCB is connected to the image processing unit using any type of electrical connection.

It would be readily apparent to one who is skilled in the art that autofocusing could be achieved by translating one or multiple lenses in the optical train while other lenses are fixed. The autofocusing lens/lenses could be at any position of the optical train, not necessary at the front side. It will also be apparent that a zooming feature in camera module could be achieved by using piston-tube electrostatic actuators such that the actuator selectively translates one or more lenses of the optical train.

Figure 9A:
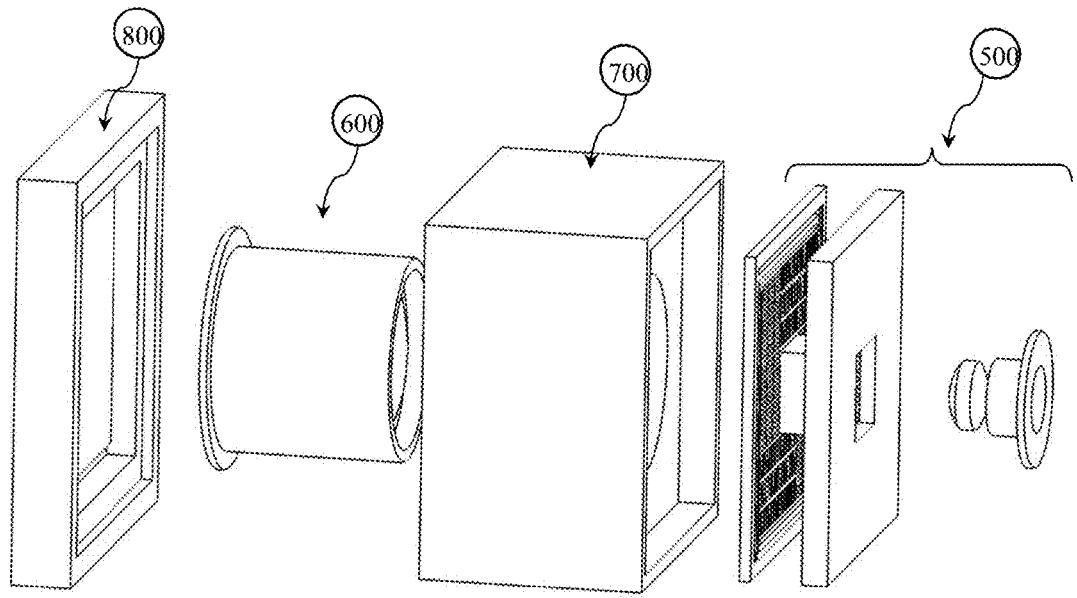
FIG. 9A is an exploded view of the final assembly of a single lens autofocus camera module including the front lens, the electrostatic piston-tube actuator, lens barrel, housing, and image sensor module, according to one embodiment of the present invention.
Figure 9B:
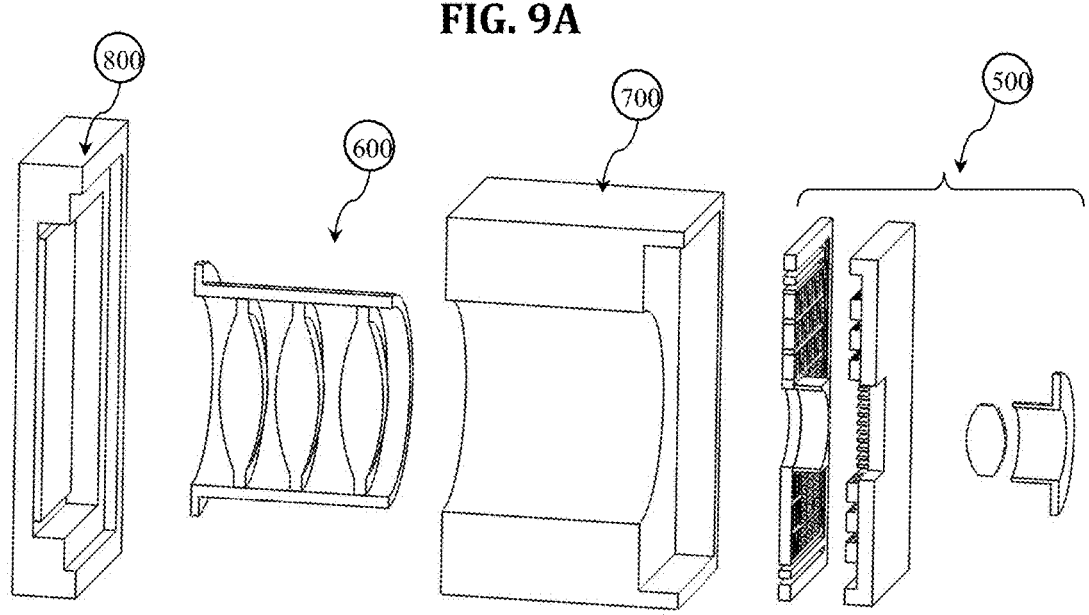
FIG. 9B is a cross-section of the exploded view of FIG. 9A.
Figure 9C:
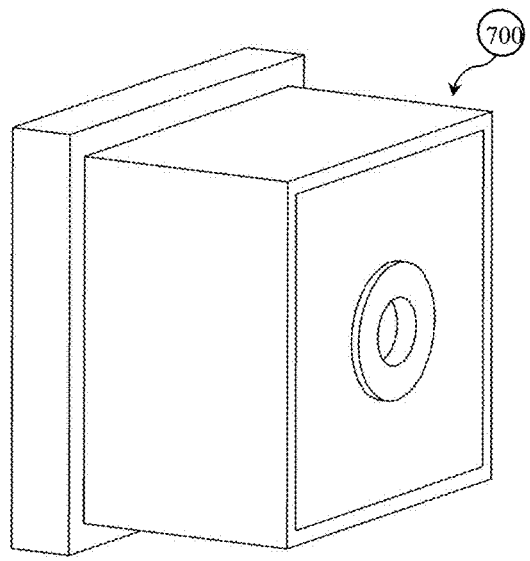
FIG. 9C is a perspective view of an assembled single lens MEMS autofocus camera module, according to one embodiment of the present invention.
Figure 9D:
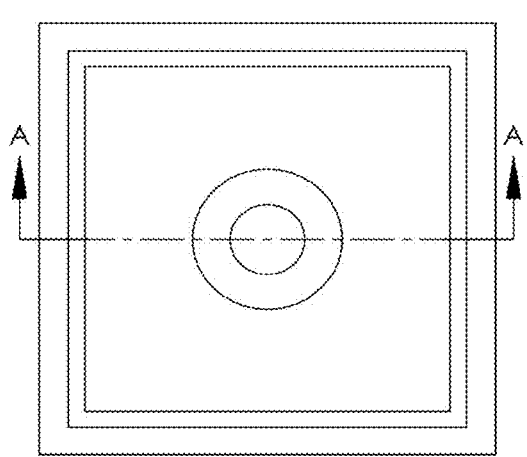
FIG. 9D is a front view of an assembled single lens MEMS autofocus camera module, according to one embodiment of the present invention.
Figure 9E:
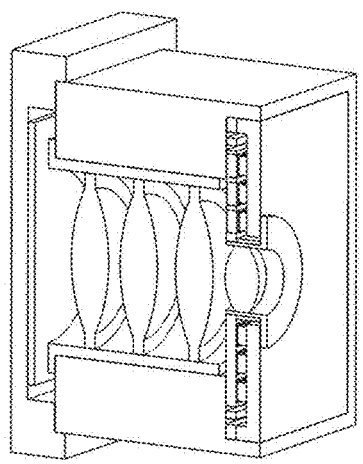
FIG. 9E is a cross-sectional perspective view of an assembled single lens MEMS autofocus camera module, according to an embodiment of the present invention.
Figure 9F:
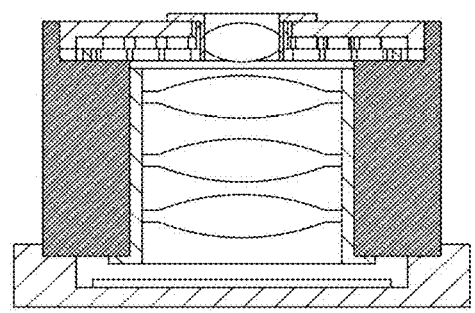
FIG. 9F is a cross-sectional view of the assembled single lens MEMS autofocus camera module, according to an embodiment of the present invention.

FIG. 9A-9B show exploded views of the camera module incorporating the MEMS autofocus actuator and all other components including the front lens, the electrostatic piston-tube actuator, lens barrel, housing, and image sensor module. FIG. 9C-9F are perspective and front views of an assembled single lens MEMS autofocus camera module.

The autofocus (AF) module of the present invention comprises of a program to capture a digital image, perform an image analysis and command the MEMS piton-tube actuator to move the lens barrel along the z-axis to achieve a focused image. The autofocus module translates the lens into the optical focusing position to ensure that the digital image can become clear. The MEMS piton-tube actuator translates the lens up to 100 microns to achieve autofocus for objects located at a distance varying from 10 cm to infinity.

The optical image stabilization (OIS) module of the present invention comprises of a program to capture a digital image, perform an image analysis and command the MEMS piton-tube actuator to tilt the lens barrel about the x and y axes to achieve a stabilized image. The optical image stabilization (OIS) module detects the frequency of hand shaking performed by the user and the module corrects the position of the lens by tilting the lens barrel.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A microelectronic mechanical system (MEMS) camera module, comprising:
 a) a MEMS electrostatic piston-tube actuator comprising:
  i) a stator plate having a central stator-opening, a multiple subarrays of pistons extending outwardly and perpendicular to said stator plate, each piston having a piston-wall, said pistons surrounding said central stator-opening, wherein the pistons in each subarray of pistons being electrically connected to each other, and the pistons in each subarray of pistons being electrically insulated from the pistons in other subarrays of pistons, and wherein each subarray of pistons being electrically addressable;
  ii) a rotor plate having a central rotor-opening and an array of spaced apart through apertures or tubes surrounding said central rotor-opening fabricated in the rotor plate, wherein said apertures being vertically aligned with said pistons, and wherein each aperture having an aperture opening sized and shaped to receive and interdigitate with each piston without the piston-walls touching the walls of said each aperture during a rotation, and the walls of said apertures being electrically connected to each other,
  iii) a plurality of springs connecting said apertures to a non-moving frame, wherein during an actuation in response to electrostatic forces from a drive voltage applied between one or more subarrays of pistons and the rotor plate, the rotor plate translates along z-axis and tilts about x and y axes;
 b) a lens barrel containing at least one lens that is attached to said central rotor-opening and extending through said central stator-opening;
 c) a housing that is sized to fit and receive said MEMS electrostatic piston-tube actuator containing said lens barrel;
 d) an image sensor module that is sized to fit and receive said housing;
 e) an autofocus (AF) module to achieve AF by moving the lens barrel along the z-axis, and
 f) an optical image stabilization (OIS) module to achieve OIS by tilting the lens barrel about the x and y axes.

2. The MEMS camera module of claim 1, wherein said MEMS electrostatic piston-tube actuator has a lens barrel holder to facilitate the attachment of the lens barrel into the central stator-opening of the MEMS electrostatic piston-tube actuator, wherein said lens barrel holder can absorb a pressing force during the attachment of the lens barrel to the MEMS electrostatic piston-tube actuator, and wherein said lens barrel holder has a thickness substantially equal to the total thickness of the MEMS electrostatic piston-tube actuator.

3. The MEMS camera module of claim 2, wherein said lens barrel holder comprising of an upper part and a lower part, wherein said upper part is formed by the thickness of the rotor plate, and said lower part is formed by the thickness of the stator plate.

4. The MEMS camera module of claim 3, wherein said lens barrel holder is fabricated by a back side etching step during a fabrication process of the MEMS electrostatic piston-tube actuator to separate the lower part from the stator plate by a predefined gap, and wherein said rotor plate is attached to a non-moving rotor-support-frame using the plurality of springs.

5. The MEMS camera module of claim 1, wherein said MEMS electrostatic piston-tube actuator has a circular, triangular, squared, pentagonal, or hexagonal outer periphery shape.

6. The MEMS camera module of claim 1, wherein said lens barrel is circular or squared.

7. The MEMS camera module of claim 1, wherein said lens barrel is attached to said MEMS electrostatic piston-tube actuator using press-fit or thread-fit.

8. The MEMS camera module of claim 1, wherein the lens barrel contains a plurality of optical lenses.

9. The MEMS camera module of claim 1, wherein said lens barrel has a straight-barrel or a stepped-barrel design.

10. The MEMS camera module of claim 1, wherein said lens barrel further contains an IR filter.

11. The MEMS camera module of claim 10, wherein said IR filter is placed between said image sensor and the housing.

12. The MEMS camera module of claim 1, wherein said lens barrel weighs at least 10 milligrams.

13. The MEMS camera module of claim 1, wherein said lens barrel moves up to 100 microns to achieve AF.

14. The MEMS camera module of claim 1, wherein said image sensor module contains an image sensor die mounted on a printed/flexible circuit board or an image sensor package.

15. The MEMS camera module of claim 1, wherein said image sensor module contains an image sensor die mounted on a printed board circuit or an image sensor package and a base sized to fit and receive said housing.

16. A microelectronic mechanical system (MEMS) camera module, comprising:
    a) a MEMS electrostatic piston-tube actuator comprising:
        i) a stator plate having a central stator-opening, multiple subarrays of pistons extending outwardly and perpendicular to said stator plate, each piston having a piston-wall, said pistons surrounding said central stator-opening, wherein the pistons in each subarray of pistons being electrically connected to each other, and the pistons in each subarray of pistons being electrically insulated from the pistons in other subarrays of pistons, and wherein each subarray of pistons being electrically addressable;
        ii) a rotor plate having a central rotor-opening and an array of spaced apart through apertures or tubes surrounding said central rotor-opening fabricated in the rotor plate, wherein said apertures being vertically aligned with said pistons, and wherein each aperture having an aperture opening sized and shaped to receive and interdigitate with each piston without the piston-walls touching the walls of said aperture during a rotation, and the walls of said apertures being electrically connected to each other,
        iii) a plurality of springs connecting said apertures to a non-moving frame, wherein during an actuation in response to electrostatic forces from a drive voltage applied between one or more subarrays of pistons and the rotor plate, the rotor plate translates and tilts in any direction;
    b) at least one moving lens attached to a central opening of said MEMS electrostatic piston-tube actuator;
    c) a lens barrel containing at least one fixed lens;
    d) a housing that is sized to fit and receive said MEMS electrostatic piston-tube actuator containing said at least one moving lens and said lens barrel that contains said at least one fixed lens;
    e) an image sensor module that is sized to fit and receive said housing;
    f) an autofocus (AF) module to achieve AF by moving the lens barrel along z-axis, and
    g) an optical image stabilization (OIS) module to achieve OIS by tilting the lens barrel about x and y axes.

17. The MEMS camera module of claim 16, wherein said MEMS electrostatic piston-tube actuator has an extended lens barrel holder that has a thickness substantially equal to said thickness of said MEMS actuator, whereby said extended lens holder facilitates the attachment of the lens barrel into the central opening of the MEMS electrostatic piston-tube actuator.

18. The MEMS camera module of claim 16, wherein said at least one fixed lens has a straight-barrel or a stepped-barrel design and a set of lenses inside the lens barrel are mounted with respect to each design.

19. The MEMS camera module of claim 16, wherein said MEMS electrostatic piston-tube actuator achieves a zooming feature for objects being captured by selectively moving one or multiple lenses within the lens barrel.

* * * * *